Dec. 29, 1936.　　　S. W. THOMPSON　　　2,065,767
DRIVE FOR INDIVIDUALLY SPRUNG WHEELS
Filed Dec. 6, 1934　　　2 Sheets-Sheet 1

INVENTOR.
S. W. Thompson
BY Thomas Howe
ATTORNEY.

Dec. 29, 1936.  S. W. THOMPSON  2,065,767
DRIVE FOR INDIVIDUALLY SPRUNG WHEELS
Filed Dec. 6, 1934  2 Sheets-Sheet 2

INVENTOR
S. W. Thompson
BY
Thomas Howe
ATTORNEY

Patented Dec. 29, 1936

2,065,767

UNITED STATES PATENT OFFICE 2,065,767

DRIVE FOR INDIVIDUALLY SPRUNG WHEELS

Seth Waldo Thompson, Essex Fells, N. J.

Application December 6, 1934, Serial No. 756,242

8 Claims. (Cl. 180—43)

This invention relates to an improved driving connection between a driving shaft and a driven wheel where the wheel axis and that of the shaft are relatively movable, and has particular reference to the driving of individually sprung automobile wheels, although it may have other applications.

The so-called "knee action" mounting of automobile wheels, whereby the wheels may be individually sprung, is well known.

It is the main object of the present invention to improve the mounting of wheels having such individual action and the driving means therefor.

Linkage, rather than gears, provides a simpler and more efficient driving means.

It is a further object of the invention to coordinate a linkage drive with the mounting of the individually sprung wheel.

In so coordinating the drive and mounting, it has been found advantageous to provide an arm rotatably mounted on the driving shaft and in which the wheel is rotatably mounted. It may therefore be said to be a further and more specific object of the invention to provide an arm, wheel and driving shaft as just mentioned, with which is coordinated the linkage drive.

The linkage drive is subject to the disadvantage that in passing a dead center the driven member may have its direction of rotation reversed which causes jamming of the parts with resultant stoppage and strain, if indeed, there is no breakage.

It is a further object of the invention to provide means coordinated with the wheel mounting and drive for preventing an occurrence as just noted whereby a certain, smooth and efficient operation is secured.

The arm above referred to, in which the wheel is mounted, may be made in the form of a casing for the linkage drive whereby the drive is prevented from injury and also prevented from injuring other objects on coming in contact with them or smearing them with lubrication. In fact such casing might be made a container for a reservoir or bath of substances for lubricating the linkage.

It may therefore be said to be a further object of the invention to provide the arm in which the wheel is mounted, in the form of a casing for the driving linkage.

Other and ancillary objects of the invention will appear hereinafter.

In the accompanying drawings which illustrate the invention—

Figure 1:
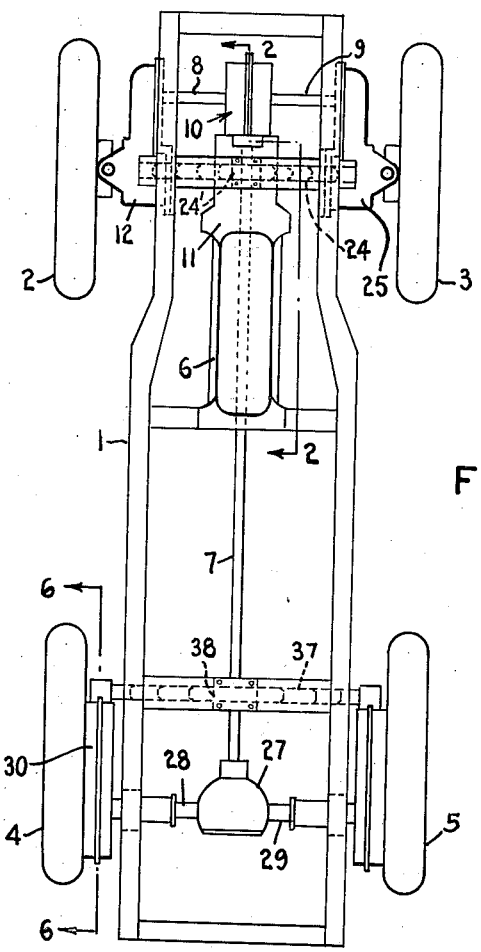
Fig. 1 is a top plan view of an automobile vehicle embodying the invention, the body being omitted so as to expose the chassis and running gear and with certain of the parts omitted for the sake of clearness.

Referring to the drawings and first to Figs. 1 to 4, the automobile therein shown has the chassis or frame 1 supported on the front wheels 2 and 3 and the rear wheels 4 and 5.

Mounted upon the chassis is the usual internal combustion engine 6 which is connected through any well known and suitable speed-changing transmission 11 with the propeller shaft 7 which is connected in driving relation with the drive shafts 8 and 9 for the wheels 2 and 3 respectively, through the differential gearing 10, the shafts 8 and 9 being journaled in the chassis. The driving mechanisms for each of the wheels 2 and 3 are precisely the same so that a description of that for the wheel 2 will suffice for both. An arm, which may take the form of a casing 12, is rotatably mounted upon the shaft 8. Rotatably mounted in the casing 12 is the shaft 13 having the crank 14. The shaft 8 is also provided with the crank 15. Rotatably mounted in the casing 12 is a third shaft 16 having a crank 17, and connecting these cranks is the rigid integral link 18 in which the pins of the cranks 14, 15, and 17 are journaled.

It will be observed that the shafts 13, 16, and 8 are out of line and that their cranks are equal and parallel. The shaft 13 is connected through the universal joint 19 with the wheel 2, so that the wheel may be driven notwithstanding its axis may be turned with relation to the axis of the shaft 13. The wheel is rotatably mounted on a sleeve 20 which is pivoted by the pins 21 and 22 in the casing 12, the usual steering rod 23 being fixed to the pin 22 and serving to turn the wheel about the axis of the knuckle constituted by the pins 21 and 22 in steering the vehicle.

The chassis is spring-mounted at its forward end by means of the transverse leaf spring 24 secured at an intermediate point 24' to the chassis and at its ends to the casing 12 corresponding to the wheel 2 and the similar casing 25 corresponding to the wheel 3.

The propeller shaft 7 extends into the usual differential gearing 27 whence extend the shafts 28 and 29 rotatably mounted in the chassis, for driving the rear wheels 4 and 5 respectively. The mountings and driving means for the rear wheels are exactly the same so that a description of one of them will be sufficient. The shaft 28 is rotatably mounted in the chassis and rotatably mounted upon it is an arm taking the form of the casing 30. The wheel 4 is fixed to the shaft 31 which is rotatably mounted in the casing 30 and has the crank 32. The shaft 28 also has the crank 33. Rotatably mounted in the casing 30 is a third shaft 34 having the crank 35 and connecting the cranks 32, 33, and 35 is the one-piece integral link 36 in which the pins of the cranks are journaled, the cranks 32, 33, and 35 being of equal length and parallel.

The chassis, in addition to the spring 24, is spring supported by means of a transverse leaf spring 37 having its intermediate point secured to the chassis at 38 and having its ends secured to the casing 30 and the corresponding casing 39 for the wheel 5.

It will be observed that in the case of each wheel, it is rotatably mounted in the end of an arm which is rotatably supported on a drive shaft having a bearing on the chassis, and that connecting these shafts is a link which forms a simple and efficient driving connection between the shafts. To avoid the disadvantage of a link drive, however, as referred to above, namely the reversal of the driven member in passing dead center, a third shaft is provided which has a crank with its pin pivoted in the link which prevents the undesirable reversal as just referred to.

It will further be observed that the arm mentioned is in the form of a casing which encloses the linkage referred to so that the linkage is protected from contact with extraneous objects which might injure the linkage or the objects or smear the latter with the linkage lubrication. The casing might even contain a bath of lubrication for the linkage drive.

It will further be observed that the shafts, linkage and the arm or casing are coordinated together so that the various parts are always in proper relationship, the driving of the wheel is effected in a simple and efficient manner, and the wheel is free to adjust itself to inequalities in the roadway, limited only by the springs.

Figure 7:
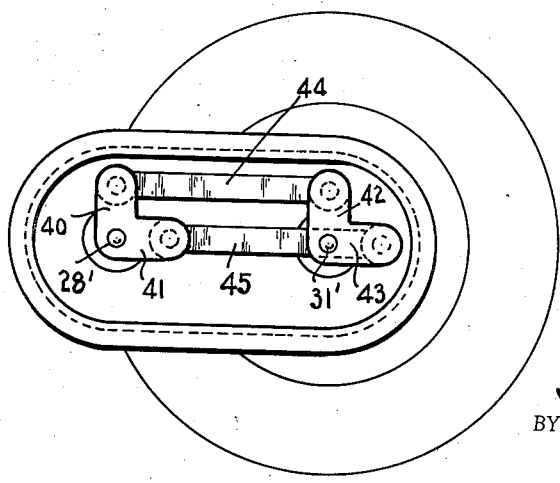
Fig. 7 is a view similar to Fig. 6 showing a modified form of wheel drive.
Figure 2:
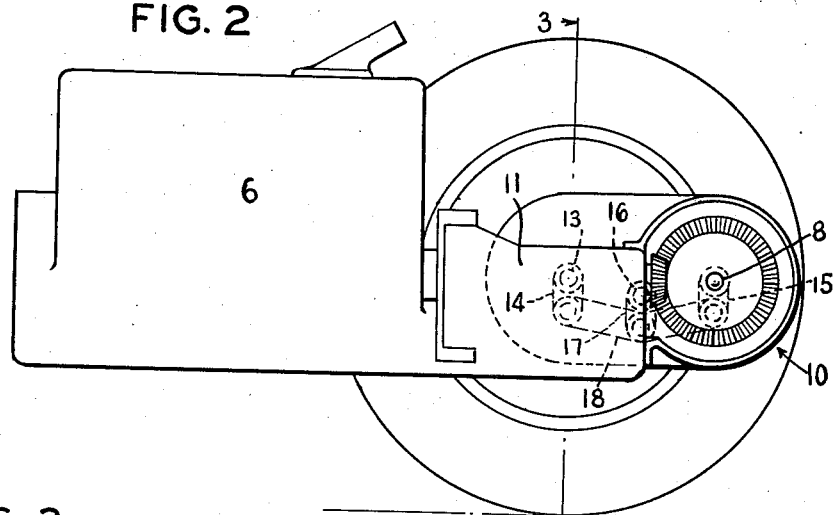
Fig. 2 is a section on the line 2—2 of Fig. 1, on an enlarged scale, certain of the parts being omitted, showing the relation of a front wheel to the driving means.
Figure 3:
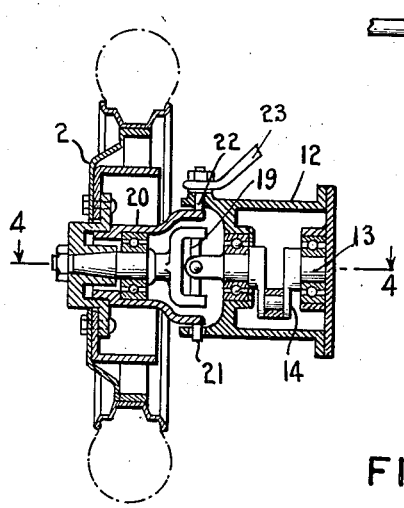
Fig. 3 is a section on the line 3—3 of Fig. 2, certain of the parts being omitted for the sake of clearness.
Figure 4:
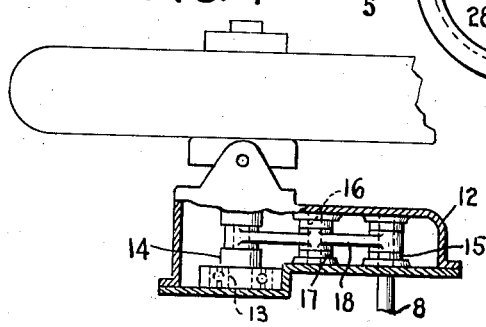
Fig. 4 is a partial section on the line 4—4 of Fig. 3, partly broken away.
Figure 5:
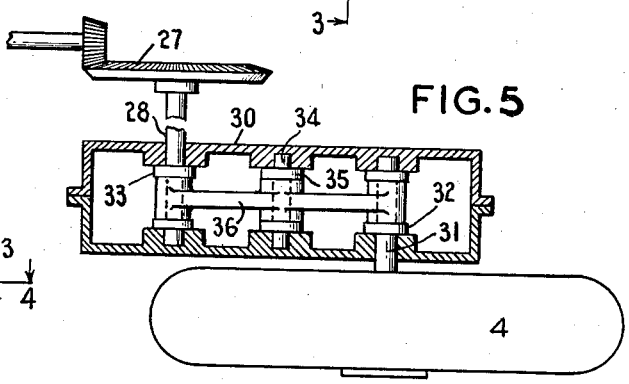
Fig. 5 is a section on the line 5—5 of Fig. 6, partly broken away and some of the parts omitted.
Figure 6:
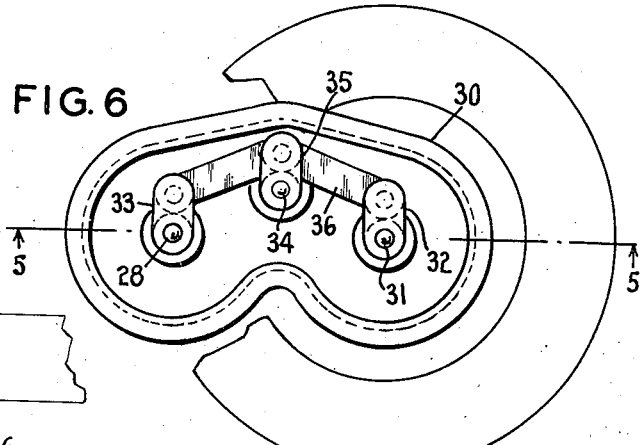
Fig. 6 is a section, on an enlarged scale, partly broken away and with some of the parts omitted, on the line 6—6 of Fig. 1.

Referring now to Fig. 7, instead of employing a third shaft to prevent undesirable reversal of the driven member on passing dead center as above referred to, the driving shaft 28' is provided with two cranks 40 and 41, which are 90° apart, while the driven or wheel shaft 31' has fixed upon it the two crank arms 42 and 43 spaced 90° from each other. Pivoted to the crank pins of the cranks 40 and 42 is the link 44, while pivoted to the crank pins of the cranks 41 and 43 is the link 45. These links form the driving connection between the driving and driven shafts and each pair of cranks with its connecting link serves to prevent the reversal of the driven member as above referred to when the other pair of cranks and their connecting link are passing dead center.

While the invention has been illustrated in what are considered its best applications it may have other embodiments without departing from its spirit and is not therefore limited to the structures shown in the drawings.

What I claim is:

1. The combination with a rotatably mounted driving shaft, of a driven shaft, a wheel connected with said driven shaft to rotate therewith, an arm pivoted about said driving shaft and in which said driven shaft is rotatably mounted, cranks on said driving and driven shafts, a link connecting said cranks and a third shaft journaled in said arm intermediate said driving and driven shafts, and having a crank with its pin journaled in said link.

2. The combination with a rotatably mounted driving shaft, of a driven shaft, a wheel connected with said driven shaft to rotate therewith, an arm pivoted about said driving shaft and in which said driven shaft is rotatably mounted, spring means resisting turning of said arm about said driving shaft, cranks on said driving and driven shafts, a link connecting said cranks and a third shaft journaled in said arm intermediate said driving and driven shafts and having a crank with its pin journaled in said link.

3. The combination with a rotatably mounted driving shaft, of a driven shaft, a wheel connected with said driven shaft to rotate therewith, an arm pivoted about said driving shaft and in which said driven shaft is rotatably mounted, cranks on said driving and driven shafts, a link connecting said cranks and a third shaft journaled in said arm intermediate said driving and driven shafts and having a crank with its pin journaled in said link, said arm being in the form of a casing enclosing said link and cranks.

4. The combination with a rotatably mounted driving shaft, of a driven shaft, a wheel connected with said driven shaft to rotate therewith, an arm pivoted about said driving shaft and in which said driven shaft is rotatably mounted, spring means resisting turning of said arm about said driving shaft, cranks on said driving and driven shafts, a link connecting said cranks and a third shaft journaled in said arm intermediate said driving and driven shafts and having a crank with its pin journaled in said link, said arm being in the form of a casing enclosing said link and cranks.

5. The combination with a rotatably mounted driving shaft, of a driven shaft, a wheel connected with said driven shaft to rotate therewith, the connection of said wheel with said driven shaft including a joint permitting the wheel axis to be turned with relation to the shaft axis, a steering knuckle, an arm pivoted about said driving shaft and in which said driven shaft is rotatably mounted, cranks on said driving and driven shafts, a link connecting said cranks and means for preventing reversal of the driven shaft on passage of the said link over dead center.

6. The combination with a rotatably mounted driving shaft, of a driven shaft, a wheel connected with said driven shaft to rotate therewith, the connection of said wheel with said driven shaft including a joint permitting the wheel axis to be turned with relation to the shaft axis, a steering knuckle, an arm pivoted about said driving shaft and in which said driven shaft is rotatably mounted, spring means resisting turning of said arm about said driving shaft, cranks on said driving and driven shafts, a link connecting said cranks and means for preventing reversal of the driven shaft on passage of the said link over dead center.

7. The combination with a rotatably mounted driving shaft, of a driven shaft, a wheel connected with said driven shaft to rotate therewith, the connection of said wheel with said driven shaft including a joint permitting the wheel axis to be turned with relation to the shaft axis, a steering knuckle, an arm pivoted about said driving shaft and in which said driven shaft is rotatably mounted, cranks on said driving and driven shafts, a link connecting said cranks and a third shaft journaled in said arm and having a crank with its pin journaled in said link.

8. The combination with a rotatably mounted driving shaft, of a driven shaft, a wheel connected with said driven shaft to rotate therewith, the connection of said wheel with said driven shaft including a joint permitting the wheel axis to be turned with relation to the shaft axis, a steering knuckle, an arm pivoted about said driving shaft and in which said driven shaft is rotatably mounted, spring means resisting turning of said arm about said driving shaft, cranks on said driving and driven shafts, a link connecting said cranks and a third shaft journaled in said arm and having a crank with its pin journaled in said link.

SETH WALDO THOMPSON.